May 3, 1966
R. C. GRAY
3,249,211
MAGNETIC, CONVEYOR RAIL SWEEP
Filed Jan. 3, 1964
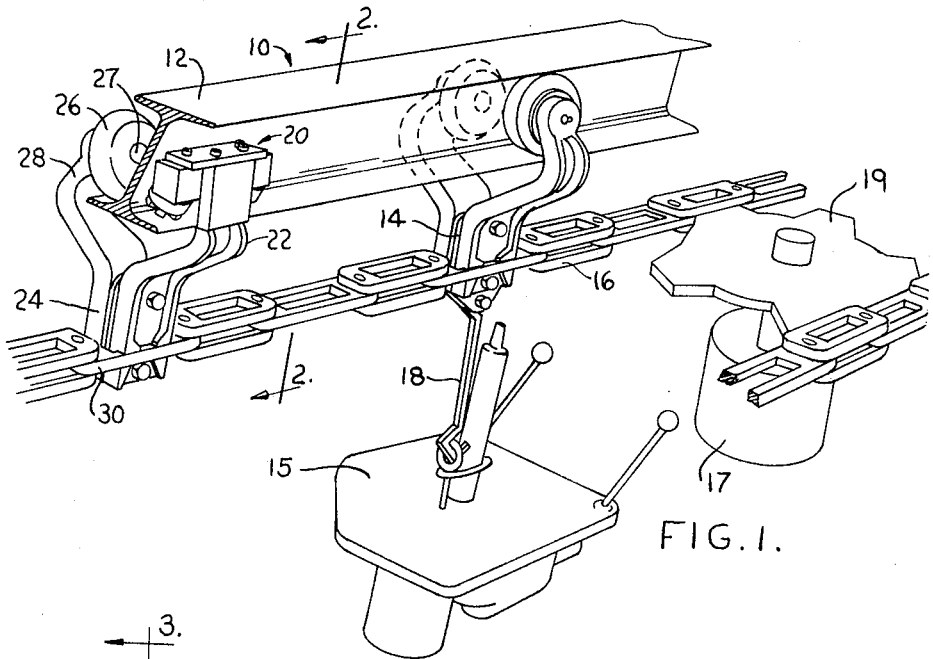
FIG. 1.
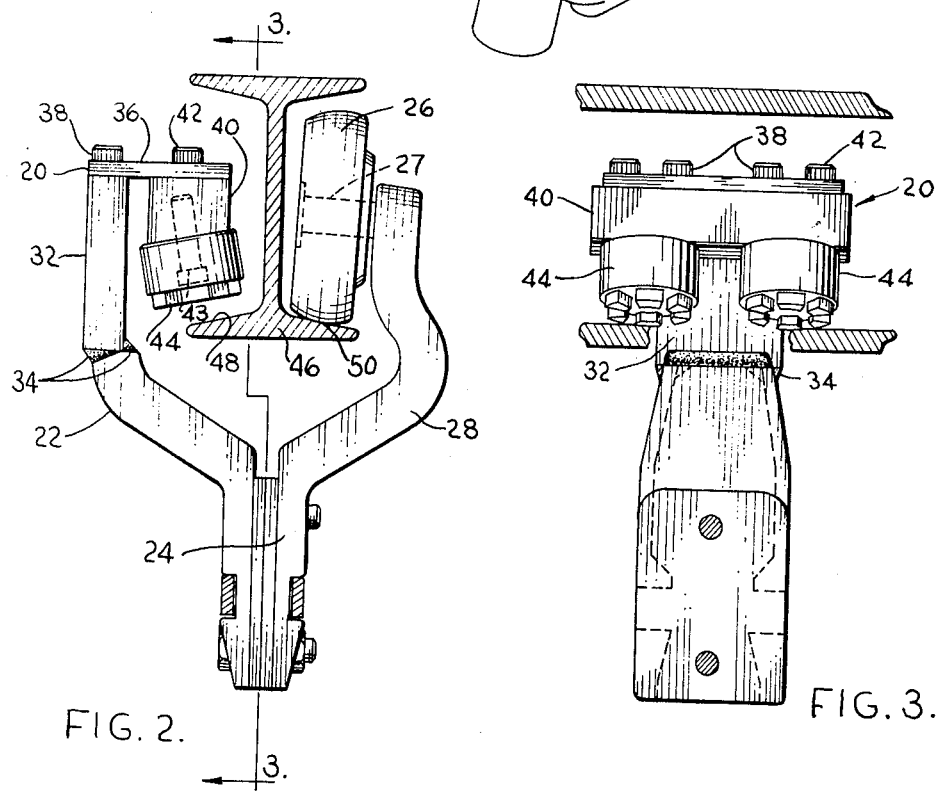
FIG. 2.
FIG. 3.

United States Patent Office 3,249,211
Patented May 3, 1966

3,249,211
MAGNETIC, CONVEYOR RAIL SWEEP
Ralph C. Gray, Clyde, Ohio, assignor to Whirlpool Corporation, Benton Harbor, Mich.
Filed Jan. 3, 1964, Ser. No. 335,539
5 Claims. (Cl. 198—229)

This invention relates in general to an improved method and a novel apparatus for cleaning conveyors and more particularly to a novel magnetic device which is capable of practicing the improved method of the invention.

An important object of the invention is to provide a magnetic cleaning device for conveyors which during use become contaminated with small metallic particles.

Another object of the invention is to provide a magnetic cleaning device for conveyors which is an integral part of the conveyor apparatus.

Still another object of the invention is to provide a magnetic cleaning device which may easily be cleaned during use.

Another important object of the invention is to provide an improved method of cleaning conveyors which may become contaminated by small metallic particles during use.

Other objects and advantages of the invention will be apparent to those skilled in the art upon reading the following description in conjunction with the accompanying drawings in which identical parts are identified by like reference numerals.

In the drawings:

FIGURE 1 is a fragmentary perspective view of a portion of a conveyor system showing the device of the invention practicing the improved method of the invention.

FIGURE 2 is a sectional view of the device of the invention taken along line 2—2 of FIGURE 1.

FIGURE 3 is a sectional view of the device of the invention taken along line 3—3 of FIGURE 2.

Conveyor systems of various types have long been used for purposes of material handling. Contamination of materials by metallic particles which drop from overhead conveyors to materials suspended from the conveyor is of particular concern to users of such conveyors. This contamination is highly undesirable where the articles being carried by the conveyor are to be coated with a material such as paint or porcelain. The contaminant not only causes unsightly roughness in the coated surface but it may also cause minute openings to occur in the coating which allow passage of air and moisture. In the case of certain metal articles, it will be understood that corrosion soon occurs in the presence of air and moisture and that this corrosion defeats the purpose of a coating operation. Furthermore, contaminants especially of a metallic nature are undesirable from other standpoints. For example, metallic particles often occur in the form of slivers which may be harmful to humans or animals through external penetration or if consumed. The invention has application in this respect in the meat and food processing industry where conveyor systems are very common. Workers on conveyor assembly lines are constantly in danger from metallic particles which may be carried by the conveyor system and which may drop into the eyes or penetrate the skin in the course of work.

In order to eliminate undesirable metal particles I have mounted permanent magnets upon trolleys carried on the conveyor. The magnets are mounted in close proximity to a rail which carries the trolleys and thereby sweep the rail clean of magnetically attractable particles. It is thus necessary only to clean the magnets and not the entire conveyor rail which may be very long or difficult to reach. Furthermore the cleaning is nearly continuous since a plurality of magnets may be carried by the conveyor at any desired interval and on both or alternate sides of the rail. Metal particles are thus picked up shortly after they are deposited on the rail and frequent manual cleanings are obviated even on easily accessible conveyors. A further advantage of my invention is that often non-metallic dirt sticks to metal particles and is picked up with such particles.

It will be understood from the preceding examples that the invention has wide application where conveyors are used. The cited examples are merely representative of the many uses of the invention and are not meant to be exhaustive of the possible uses.

Referring now to the drawings, I will give a detailed description of an exemplary device embodying my invention and will describe how that device practices the method of my invention.

As best shown in FIGURE 1, a conveyor system 10 comprises a rail 12 suitably mounted in an overhead manner, a trolley 14 carried by rail 12, a driven chain 16 to which trolley 14 is attached in any suitable manner, a hook 18 suspended from trolley 14 for carrying the part 15 on the conveyor line, and conveyor drive means which have been illustrated in FIGURE 1 as an electric motor 17 driving a conventional chain sprocket 19 which in turn drives chain 16 through an interconnected drive shaft. Since conveyor systems are well known, I have omitted many details of construction and have described only the basic elements of an exemplary conveyor system.

A magnetic sweep device 20 is shown attached to one arm 22 of a Y shaped trolley 24. Trolley 24 is similar to trolley 14 and may be made from a used trolley such as 14. A roller 26 is rotatably mounted on a shaft 27 which is mounted on the other arm 28 of trolley 24. Roller 26 engages rail 12 and is carried thereby. The lower portions of trolley arms 22 and 28 are attached to chain 16 by means of a link of a chain 16 in any suitable manner. To attach the trolley to the chain, I have provided the lower portions of trolley arms 22 and 28 with grooves which receive the sides of link 30 as shown in FIGURE 2. Spacer elements are inserted between the lower portions of trolley arms 22 and 28 and the arms are bolted together substantially filling the opening of link 30 as shown in FIGURES 1 and 2. As chain 16 is driven, trolley 24 rolls along rail 12 on roller 26.

Referring now to FIGURES 2 and 3, the magnetic sweep device 20 will be described. A vertical support member 32 is welded to the upper end of arm 22 as at 34. Attached to support member 32 is a horizontal support plate 36 of brass or other non ferrous material. Plate 36 is secured to support 32 by a pair of socket head screws 38. An aluminum spacer 40 is secured to the underside of plate 36 by a pair of socket head screws 42. The bottom face of spacer 40 is angled downward in a somewhat parallel relationship to the upper face 48 of the lower flange of the rail 12. Mounted on the angled face of spacer 40 are two six pole cylindrical magnets 44, although other magnet designs may be used. Mounting may be accomplished by any suitable means but I have mounted the magnets 44 by means of a single socket head screw 43 for each magnet 44. The screws 43 extend axially of the magnets 44 with the screw heads fitting into recesses provided to receive the heads.
It will be noted that rail 12 is I-shaped and that a lower flange or crossmember 46 of rail 12 has an angled upper surface as at 48. The angled surface of spacer 40 and angled surface 48 are approximately parallel. Thus when the cylindrical magnets 44 are mounted on spacer 40, their poles are approximately parallel to surface 48 of rail 12 and spaced adjacent thereto. While the latter parallel relationship is not essential, I have found that my invention operates most effectively if this relationship is maintained. The magnets 44 are spaced from the rail, preferably up to about one inch from surface 48.

Brass plate 36 is provided to insulate the magnets from the trolley 24 which is made of cast iron in the exemplary device, but any other suitable magnetic insulating material could be used. Aluminum spacer 40, which I have used to reduce the weight of the magnetic sweep device 20, further insulates the magnets. Reducing the weight of magnetic sweep device 20 helps to balance the trolley assembly which may otherwise have a tendency to pivot counter clockwise about the roller to rail contact point 50 as viewed in FIGURE 2 though chain 16 assists in maintaining trolley 24 in proper relationship to rail 12.

As previously mentioned, cleaning the magnets is a relatively simple operation. I prefer to use pressurized air in the cleaning process but other methods are equally acceptable. A source of pressurized air is provided in a non-contaminate area where an operator periodically subjects the magnets to a blast of pressurized air thereby freeing them of dirt and metallic particles which the magnets have accumulated in previous sweeps of the conveyor rail.

While the exemplary device is well suited to clean a conveyor of attractable metal particles, it will be understood that the method could be accomplished manually or by other mechanical devices such as by providing a separate conveyor system to carry the magnetic cleaning device.

Having described my invention as related to an exemplary embodiment, it is my intention that the invention not be limited by details of my description, but be construed broadly within the scope of the accompanying claims.

I claim:
1. In a conveyor system:
 (a) rail means,
 (b) conveyor means movably mounted on said rail means,
 (c) and magnetic means carried by said conveyor means and provided with magnetic pole pieces spaced adjacent and openly confronting said rail means for sweeping said rail means free of magnetically attractable particles during movement of said conveyor means relative to said rail means.
2. In a conveyor system:
 (a) trolley means,
 (b) rail means for carrying said trolley means,
 (c) driven means attached to said trolley means,
 (d) drive means for driving said driven means, and
 (e) magnetic means carried by said trolley means and provided with magnetic pole pieces shaped adjacent and openly confronting said rail means,
 whereby when said drive means drives said driven means, said magnetic means sweeps said rail means clean of magnetically attractable particles.
3. In a conveyor system:
 (a) trolley means,
 (b) rail means carrying said trolley means,
 (c) driven means attached to said trolley means,
 (d) drive means for driving said driven means,
 (e) magnetic insulating means mounted on said trolley means, and
 (f) a magnet carried by said magnetic insulating means and provided with magnetic pole pieces positioned in parallel spaced relationship to and openly confronting said rail means for sweeping said rail means free of magnetically attractable particles.
4. In a conveyor system:
 (a) trolley means,
 (b) rail means including a laterally extending flange portion for carrying said trolley means,
 (c) driven means attached to said trolley means,
 (d) drive means for driving said driven means,
 (e) magnetic insulating means mounted on said trolley means, and
 (f) magnetic means carried by said magnetic insulating means and provided with magnetic pole pieces positioned in parallel spaced relationship to and openly confronting said laterally extending flange portion of said rail means for sweeping said laterally extending flange portion free of magnetically attractable particles.
5. The conveyor apparatus set forth in claim 4 wherein said trolley means includes a Y-shaped member having spaced arms and roller means mounted on one of said arms for engagement with said laterally extending flange, said magnetic means being carried by the other of said arms and wherein said rail means is of I-shaped configuration in cross section and includes a portion interposed between said roller means and said magnetic means.

References Cited by the Examiner
UNITED STATES PATENTS
2,759,606  8/1956  Nippert _____ 198—229
2,915,019  12/1959 Tieman _____ 104—279

EVON C. BLUNK, *Primary Examiner.*

RICHARD E. AEGERTER, *Examiner.*